(12) United States Patent
Piazza

(10) Patent No.: US 7,128,781 B1
(45) Date of Patent: *Oct. 31, 2006

(54) CEMENTITIOUS COMPOSITIONS AND METHODS OF MAKING CEMENTITIOUS COMPOSITIONS

(75) Inventor: Matthew R. Piazza, Madeira Beach, FL (US)

(73) Assignee: Carpentercrete, LLC, Boynton Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/230,963

(22) Filed: Aug. 29, 2002

(51) Int. Cl.
*C04B 14/30* (2006.01)
*C04B 24/00* (2006.01)
*C04B 7/00* (2006.01)

(52) U.S. Cl. .................. 106/711; 106/724; 106/725; 106/726; 106/728; 106/802; 106/809; 106/810; 106/823

(58) Field of Classification Search ................ 106/711, 106/724, 725, 726, 728, 802, 809, 810, 823
See application file for complete search history.

(56) References Cited

U.S. PATENT DOCUMENTS

| | | | |
|---|---|---|---|
| 1,185,775 A | 8/1916 | Conwell | |
| 1,547,713 A | 7/1925 | Alles | |
| 1,791,630 A | 2/1931 | Miller | |
| 3,331,695 A | 7/1967 | Angstadt et al. | |
| 3,642,506 A | 2/1972 | Johnson | |
| 3,984,957 A | 10/1976 | Piazza | |
| 4,069,629 A | 1/1978 | Piazza | |
| 4,070,199 A | 1/1978 | Downing et al. | |
| 4,084,362 A | 4/1978 | Piazza | |
| 4,088,804 A | 5/1978 | Cornwell et al. | |
| 4,123,212 A | 10/1978 | Piazza | |
| 4,133,859 A | 1/1979 | Piazza | |
| 4,140,836 A | 2/1979 | Wallace | |
| 4,164,532 A | 8/1979 | Piazza | |
| 4,175,867 A | 11/1979 | Piazza | |
| 4,186,536 A | 2/1980 | Piazza | |
| 4,222,920 A | 9/1980 | Crisp et al. | |
| 4,229,224 A | 10/1980 | Dawson et al. | |
| 4,229,497 A | 10/1980 | Piazza | |
| 4,233,787 A | 11/1980 | Piazza | |
| 4,252,767 A | 2/1981 | Piazza et al. | |
| 4,280,974 A | 7/1981 | Piazza | |
| 4,306,911 A | 12/1981 | Gordon et al. | |
| 4,315,391 A | 2/1982 | Piazza | |
| 4,318,744 A | 3/1982 | Dodson | |
| 4,405,372 A | 9/1983 | Serafin et al. | |
| 4,410,366 A | 10/1983 | Birchall et al. | |
| 4,701,513 A | 10/1987 | Lin | |
| 4,778,718 A | 10/1988 | Nicholls | |
| 4,799,961 A | 1/1989 | Friberg | |
| 4,814,014 A | 3/1989 | Arfaei | |
| 4,940,844 A | 7/1990 | Blunt | |
| 4,946,506 A | 8/1990 | Arfaei et al. | |
| 4,961,790 A | 10/1990 | Smith et al. | |
| 4,972,025 A | 11/1990 | Tsubakimoto et al. | |
| 4,978,392 A | 12/1990 | Kilbarger et al. | |
| 5,176,753 A | 1/1993 | Brook | |
| 5,234,754 A | 8/1993 | Bache | |
| 5,294,256 A | 3/1994 | Weigand et al. | |
| 5,298,071 A | 3/1994 | Vondran | |
| 5,326,396 A | 7/1994 | Abdelrazig et al. | |
| 5,389,706 A | 2/1995 | Heathman et al. | |
| 5,399,195 A | 3/1995 | Hansen et al. | |
| 5,433,777 A | 7/1995 | Sheppard | |
| 5,453,310 A | 9/1995 | Andersen et al. | |
| 5,478,391 A | 12/1995 | Babaev et al. | |
| 5,478,521 A | 12/1995 | Scheiner | |
| 5,494,516 A | 2/1996 | Drs et al. | |
| 5,508,072 A | 4/1996 | Andersen et al. | |
| 5,525,155 A | 6/1996 | Allen | |
| 5,527,388 A | 6/1996 | Berke et al. | |
| 5,599,634 A | 2/1997 | Davies | |
| 5,614,017 A | 3/1997 | Shawl | |
| 5,622,558 A | 4/1997 | Berke et al. | |
| 5,626,663 A | 5/1997 | Berke et al. | |
| 5,634,972 A | 6/1997 | Pacanovsky et al. | |
| 5,641,352 A | 6/1997 | Jeknavorian et al. | |
| 5,641,584 A | 6/1997 | Andersen et al. | |
| 5,665,439 A | 9/1997 | Andersen et al. | |
| 5,670,578 A | 9/1997 | Shawl | |
| 5,674,929 A | 10/1997 | Melbye | |
| 5,686,181 A | 11/1997 | Takano et al. | |
| 5,725,654 A | 3/1998 | Shawl et al. | |
| 5,728,209 A | 3/1998 | Bury et al. | |
| 5,753,368 A | 5/1998 | Berke et al. | |
| 5,779,788 A | 7/1998 | Berke et al. | |
| 5,785,751 A | 7/1998 | Bashlykov et al. | |
| 5,792,252 A | 8/1998 | Sprouts | |
| 5,854,318 A | 12/1998 | Tahara et al. | |
| 5,916,361 A | 6/1999 | Molloy et al. | |
| 5,919,300 A * | 7/1999 | Burge et al. ................. | 106/727 |

(Continued)

FOREIGN PATENT DOCUMENTS

WO    WO 95/30630    11/1995

(Continued)

*Primary Examiner*—Elizabeth D. Wood
(74) *Attorney, Agent, or Firm*—Jack Schwartz & Associates

(57) ABSTRACT

Cementitious compositions having high compressive strength and high flexibility. An efficient method of making such strong cementitious compositions entails pre-mixing cement additives that can easily be added to a mixture of cement, silica, fibers and water. The cementitious compositions can be used to make strong, thin layers, such as tiles, that are relatively lightweight, as well as heavy structures, such as roads and bridges, without additional reinforcement.

22 Claims, No Drawings

U.S. PATENT DOCUMENTS

| | | |
|---|---|---|
| 5,938,835 A | 8/1999 | Shawl et al. |
| 5,985,989 A | 11/1999 | Shawl et al. |
| 5,997,631 A | 12/1999 | Cho |
| 6,099,638 A | 8/2000 | Garcia |
| 6,176,920 B1 | 1/2001 | Murphy et al. |
| 6,214,958 B1 | 4/2001 | Le-Khac et al. |
| 6,277,191 B1 | 8/2001 | Budiansky et al. |
| 6,290,772 B1 | 9/2001 | Cheung et al. |

FOREIGN PATENT DOCUMENTS

| | | |
|---|---|---|
| WO | WO 96/06059 | 2/1996 |
| WO | WO 00/44833 | 8/2000 |

* cited by examiner

CEMENTITIOUS COMPOSITIONS AND METHODS OF MAKING CEMENTITIOUS COMPOSITIONS

BACKGROUND OF THE INVENTION

1. Field of the Invention

This invention is directed to cementitious compositions, and methods of making cementitious compositions in which certain chemicals are pre-mixed.

2. Description of Related Art

A variety of cement additives are commercially available for enhancing the structural properties of cement. However, when the compressive strength of cement is increased, the cement typically becomes less flexible and more brittle. Consequently, tensile strength also decreases as the compressive strength is increased. Thus, optimization of the structural properties of cement compositions typically involves a compromise between compressive strength, flexibility, and tensile strength.

Heavy, pre-cast concrete products, such as bridges and roads, typically include reinforcements, such as steel reinforcement bars or steel mesh, or entail pre-stress methods such as tightening an embedded cable while the concrete is curing. These reinforcements are necessary because of the need to balance compressive strength with flexibility and tensile strength. For the same reasons, large, thin sheets of unreinforced concrete are generally impractical due to either the brittleness or weakness inherent in such structures.

The process of making cementitious compositions can be time-consuming, particularly when attempting to enhance (and balance) the structural properties of the composition with various commercially available additives.

Accordingly, there is a need or desire for a cementitious composition that can achieve high compressive strength while also achieving high flexibility and tensile strength. There is a further need or desire for cementitious compositions that can be used to make large structures, such as roads and bridges, without requiring added reinforcement. There is yet a further need or desire for cementitious compositions that can be used to make large, thin sheets that are relatively flexible. There is still a further need or desire for an efficient method of making cementitious compositions.

SUMMARY OF THE INVENTION

The present invention relates to strong, flexible cementitious compositions and methods of making such cementitious compositions.

The compositions include cement additives that are commercially available for enhancing the structural properties of cement, added to a mix of cement, silica, and blends of fiber. In the present invention, the cement additives are used in proportions far outside the range of recommended use. The resulting compositions have high compressive strength, high flexibility, and high viscosity, without compromising any of these qualities.

In view of the desirable structural properties of the compositions of the present invention, these compositions can be used to make heavy objects, such as pre-cast concrete products including structural elements for roads and bridges, without additional reinforcement, as well as thin, large sheets that are relatively lightweight, strong and durable.

The fibers in the cementitious compositions of the invention are homogeneously mixed into the compositions, thereby enabling these cementitious compositions to be bent, shaped and twisted into products while the cementitious compositions are still wet. The cementitious compositions have the unusual ability, when made into thin sheets roughly ¼-inch to about ½-inch thick, to be able to bond to itself as though it has been fused, without any apparent cold joint or line otherwise formed by two parts meeting. Due to this unusual property, a variety of products can be made from these cementitious compositions with encapsulated cores therein which can be boxed into any shape.

The cementitious compositions can be made using pre-mixed additives, thereby saving considerable time in mixing and formulating.

It is therefore an object of the invention to provide cementitious compositions having high compressive strength, high flexibility, and high viscosity.

It is another object of the invention to provide cementitious compositions that can be used to make heavy structural elements without additional reinforcement.

It is still another object of the invention to provide cementitious compositions that can be used to make thin, strong, flexible structures.

It is yet another object of the invention to provide efficient methods of making cementitious compositions.

The foregoing and other features and advantages of the present invention will become further apparent from the following detailed description of the presently preferred embodiments. The detailed description is intended to illustrate the present invention rather than limit the scope of the present invention as defined by the appended claims and equivalents of the appended claims.

DETAILED DESCRIPTION OF PREFERRED EMBODIMENTS

The invention is directed to cementitious compositions, also referred to as compositions, having high compressive strength as well as high flexibility and tensile strength. These compositions are made using chemical additives that are commercially available for improving the properties of concrete. However, the proportions in which these chemical additives are used are contrary to the uses for which they were intended. As a result, the compositions are much stronger than conventional concrete and thus may be used for the same applications as conventional concrete, i.e., roads and bridges, but without any reinforcement structure. Furthermore, the compositions may be used to make large, thin sheets, for example 4-feet by 8-feet or larger, at a thickness as low as ¼-inch, suitably between ¼-inch and ½-inch.

The cementitious compositions of the invention include cement, silica, a plurality of fibers, and water. To this cement/silica mixture is added at least two pre-mixed cement additives. These cement additives are each individually pre-mixed with water before being added, either separately or simultaneously, to the cement/silica mixture. The cement additives may include a superplasticizer, a bonding agent, a shrinkage retarder, a carboxylated polyether concrete additive, and/or a set accelerator. Specific examples of suitable compositions are illustrated in Examples 1–6.

The amounts of each of the components of the compositions may vary, depending on the combinations of the chemical additives, but generally, for each 100 pounds of the cement and the silica, between 3 ounces and 10 ounces superplasticizer, between 3 ounces and 1 quart bonding agent, between 0.5 quart and 3 quarts set accelerator, between 1.5 ounces and 0.5 quart shrinkage retarder, and/or between 3 ounces and 2 quarts carboxylated polyether concrete additive, may be included in the compositions.

Alternatively, between 3 ounces and 1 quart shrinkage retarder and/or between 6 ounces and 32 ounces superplasticizer per 100 pounds of the cement and the silica may be suitable. If the composition is being poured into a vertical mold, the superplasticizer should not exceed 6 ounces per 100 pounds of the cement/silica mixture. These cement additives are commercially available from various construction product companies, including Grace Construction Products of Cambridge, Mass., Sillrow, and Sonoborne.

A suitable superplasticizer is a blend of sodium/potassium naphthalene sulfonate salts, lignosulfonate and hydroxycarboxylic acid salts, available under the trademark DARACEM®-100, from Grace Construction Products. A suitable bonding agent is DARAWELD®-C, also available from Grace Construction Products. The bonding agent coats the fiber to insure a bond to the cementitious mix. Such bonding agents are normally used to bond new and old cement or concrete, but have been found to provide added strength to the cementitious compositions of the present invention. A suitable shrinkage retarder is ECLIPSE™ shrinkage reducing admixture, available from Grace Construction Products. A suitable carboxylated polyether concrete additive is ADVA™ Cast, available from Grace Construction Products. A suitable set accelerator is a calcium nitrate/nitrite based solution available under the trademark POLARSET® from Grace Construction Products.

In addition to any of the cement additives listed above, any one or more of the following additives may also be included in the compositions of the invention: an air entraining agent, a finishing enhancer, a water reducer, fumed microsilica, metakaolin, and dye. Metakaolin can be added to the cement/silica mixture to reduce the permeability of the cement paste which helps to prevent the ingress of aggressive substances in solution, and metakaolin also increases the compressive strength of concrete. Alternatively, or in addition, an acrylic latex, such as SILPRO™ C-21 Acrylic Latex, available from Silpro Masonry Systems Inc. of Ayer, Mass., can be added to the cement/silica mixture to improve the strength, flexibility and adhesion of the cementitious composition.

Any suitable cement and silica can be used for the cement/silica mixture. Suitable cement may include gray or white Portland number 1. Suitable silica may include very fine silica glass, black beauty slag, fumed silica or fumed silica slurry. One suitable type of condensed silica fume slurry is FORCE 10,000® microsilica, available from Grace Construction Products. The cement and silica are suitably present in the compositions in a ratio of about 1:1. This high cement content is likely to undergo shrinkage upon setting, which is why the addition of a shrinkage retarder can be beneficial.

The compositions of the invention have a low water ratio. Furthermore, the water content is offset with the cement additives as well as any additional additives, such as dye. The compositions suitably include up to about 2 gallons of water per 100 pounds of the cement/silica mixture. More particularly, all of the liquids included in the composition may total as much as 2 gallons. As shown in the Examples, the amount of water, or total liquids, present may be lower, such as up to 244 ounces, or up to 204 ounces per 100 pounds of the cement/silica mixture. Some of the water is used to pre-mix the cement additives before adding the cement additives to the cement/silica mixture, as described in greater detail below.

The fibers in the cement/silica mixture are in a range of about one-quarter-inch to about 1-inch, preferably about one-half-inch chopped fiberglass type E or any other suitable fiberglass known to those skilled in the art, and/or about two-inch structural synthetic fibers such as of polypropylene and/or polyethylene, and/or synthetic microfiber and/or microfilament such as of polyethylene and/or polypropylene and/or any other suitable synthetic microfiber and/or microfilament known to those skilled in the art, or a combination of any of these. For example, the compositions may include up to about 2 pounds of chopped ½-inch fiberglass along with up to 4 ounces of 2-inch structural fibers per 100 pounds of the cement/silica mixture. As another example, the compositions may include up to about 16 ounces of chopped ½-inch fiberglass, up to 4 ounces of 2-inch structural fibers, and up to about 4 ounces of synthetic microfibers per 100 pounds of the cement/silica mixture. One example of a suitable structural fiber is a polypropylene/polyethylene blend fiber available under the trademark GRACE MICROFIBER™ from Grace Construction Products. Other suitable fibers include rubber-buffing fiber from waste tires, polyethylene and polypropylene structural fibers, and fibers commercially available under the trademark KAVLAR™ from E.I. Du Pont de Nemours and Company of Wilmington, Del. Any other suitable fibers known to those skilled in the art may also be used in addition to or in place of any fiber mentioned in this specification.

The cementitious compositions of the invention may be made by pre-mixing the cement additives with water and adding the pre-mixed cement additives to the cement/silica mixture. The pre-mixed cement additives can be added to the cementitious composition immediately after being pre-mixed, or can be stockpiled for later use. Once each cement additive has been pre-mixed, the pre-mixed additives can be added to the cementitious composition either separately from one another or together. With water as a carrying agent, no problematic chemical reactions occur between the cement additives. The method saves considerable time in the process of making cementitious compositions, and the resulting compositions are thoroughly mixed without forming clumps of fibers within the compositions.

Various methods can be used to mix the pre-mixed additives into the cement/silica mixture. These methods include using a tumble mixer, a paddle mixer, a high-speed pan mixer, or a static mixer. A tumble mixer is a conventional concrete mixer. A high-speed mixer is typically used for mixing large volumes of concrete or cement. Static mixing is a method usually used in the food or chemical industry where viscosity is not a problem. Because some of the compositions of the present invention are very fluid, a static mixer is a suitable option. Once the pre-mixed additives are mixed into the cement/silica mixture, the mixture is poured into a mold.

The fibers can be blended into the mixture homogeneously by wetting them out in the liquid portion of the composition, thus enabling an unusually high volume of the fibers to be incorporated into the compositions. This wetting out process prevents clumps of fibers from forming within the compositions.

When making thin sheets from the compositions of the invention, a method known as pin rolling can be used to distribute the fibers in such a way that the fibers interlock as though they were sprayed into the mold in random form. More particularly, pin rolling involves rolling out the sheet of material, namely the cementitious composition, with a roller having spikes on it, thus producing pin holes in the sheet. The roller is rolled over the sheet in various directions. Another roller, a smooth roller, is then used to roll the sheet thus misaligning the fibers.

The methods by which the fibers are incorporated into the compositions enables the compositions to be bent, shaped and twisted into products while the compositions are still wet. When the composition is between about 0.25 inch and about 0.5 inch thick, the composition can be bonded to itself as though it has been fused, without any apparent cold joint or line of two parts meeting. This flexibility enables the compositions to be conducive to encapsulating a core, such as a foam core, within the compositions which can be boxed into any shape.

The foam core provides a flexible structure for purposes of molding the cement into various shapes. For example, the foam core can be bent on an assembly line for mass-producing various shapes of cement forms. This process can be used to make furniture, architectural elements, tables, countertops, lighting fixtures, wallcoverings, fireplaces, and many other products. The texture of the finished product can be smooth or patterned. Furthermore, the cementitious compositions include the desirable properties of stone, such as strength and durability, without the weight constraint of stone.

Examples 1–7, below, illustrate various cementitious compositions made according to the method of the invention. Objects made from the cementitious compositions of the invention have remarkable compressive strength as well as remarkable flexibility, as shown in Example 7 below. Conventional concrete typically has compressive strength in a range of about 2500 to about 4000 PSI, and can be increased up to about 9000 PSI but loses its flexural and tensile strength at such high compressive strength. As Example 7 shows, the compositions of the invention provide strength benefits not found in conventional concrete.

EXAMPLES

Example 1

An encapsulated cementitious composition was made by pre-mixing 6 ounces (oz.) DARACEM®-100 superplasticizer with water, and separately pre-mixing 6 oz. bonding agent with water. Two pounds (lbs.) of ½-inch fiberglass, 4 oz. of 2-inch structural fibers, and a total of 244 oz. of water (244 oz. minus the amounts of water pre-mixed with the superplasticizer and the bonding agent) were combined with 50 lbs. of cement and 50 lbs. of silica. The pre-mixture of superplasticizer was then added to the cement/silica mixture. The pre-mixture of bonding agent was then added to the cement/silica mixture. The cementitious composition was mixed by static mixing. After mixing the cementitious composition, a foam core was encapsulated in the mixture.

Example 2

An encapsulated cementitious composition was made by pre-mixing 6 oz. DARACEM®-100 superplasticizer with water, and separately pre-mixing 6 oz. bonding agent with water. Two pounds (lbs.) of ½-inch fiberglass, 4 oz. of 2-inch structural fibers, a total of 2 gallons of water (2 gallons minus the amounts of water pre-mixed with the superplasticizer and the bonding agent), and dye were combined with 50 lbs. of cement and 50 lbs. of silica. The pre-mixture of bonding agent was then added to the cement/silica mixture. The pre-mixture of superplasticizer was then added to the cement/silica mixture. The cementitious composition was mixed by static mixing. After mixing the cementitious composition, a foam core was encapsulated in the mixture.

Example 3

A cementitious tile composition was made by pre-mixing 6 oz. DARACEM®-100 superplasticizer with water, separately pre-mixing 6 oz. bonding agent with water, and separately pre-mixing 3 oz. ECLIPSE™ floor shrinkage retarder. Two pounds (lbs.) of ½-inch fiberglass, 4 oz. of 2-inch structural fibers, and a total of 244 oz. of water (244 oz. minus the amounts of water pre-mixed with the superplasticizer, the bonding agent, and the shrinkage retarder) were combined with 50 lbs. of cement and 50 lbs. of silica. The pre-mixture of superplasticizer was then added to the cement/silica mixture. The pre-mixture of bonding agent was then added to the cement/silica mixture. The pre-mixture of shrinkage retarder was then added to the cement/silica mixture. The cementitious composition was mixed by static mixing. After mixing the cementitious composition, the cementitious composition was poured into a mold to form a tile.

Example 4

A cementitious tile composition was made by pre-mixing 6 oz. DARACEM®-100 superplasticizer with water, separately pre-mixing 6 oz. bonding agent with water, and separately pre-mixing 3 oz. ECLIPSE™ floor shrinkage retarder. Two pounds (lbs.) of ½-inch fiberglass, 4 oz. of 2-inch structural fibers, and a total of 2 gallons of water (2 gallons minus the amounts of water pre-mixed with the superplasticizer, the bonding agent, and the shrinkage retarder), and dye were combined with 50 lbs. of cement and 50 lbs. of silica. The pre-mixture of superplasticizer was then added to the cement/silica mixture. The pre-mixture of bonding agent was then added to the cement/silica mixture. The pre-mixture of shrinkage retarder was then added to the cement/silica mixture. The cementitious composition was mixed by static mixing. After mixing the cementitious composition, the cementitious composition was poured into a mold to form a tile.

Example 5

A cementitious tile composition was made by pre-mixing 16 oz. bonding agent with water, separately pre-mixing 25 oz. ADVA™ 120 carboxylated ether concrete additive with water, and separately pre-mixing 12 oz. ECLIPSE™ floor shrinkage retarder. One pound (lb.) of ½-inch fiberglass, 4 oz. of 2-inch structural fibers, 4 oz. synthetic microfiber, and a total of 204 oz. of water (204 oz. minus the amounts of water pre-mixed with the bonding agent, the carboxylated ether concrete additive, and the shrinkage retarder) were combined with 50 lbs. of cement and 50 lbs. of silica. The pre-mixture of bonding agent was then added to the cement/silica mixture. The pre-mixture of carboxylated ether concrete additive was then added to the cement/silica mixture. The pre-mixture of shrinkage retarder was then added to the cement/silica mixture. The cementitious composition was mixed by static mixing. After mixing the cementitious composition, the cementitious composition was poured into a mold to form a tile.

Example 6

A cementitious tile composition was made by pre-mixing 16 oz. bonding agent with water, separately pre-mixing 25 oz. ADVA™ 120 carboxylated ether concrete additive with water, and separately pre-mixing 12 oz. ECLIPSE™ floor shrinkage retarder. One pound (lb.) of ½-inch fiberglass, 4 oz. of 2-inch structural fibers, 4 oz. synthetic microfiber, a total of 204 oz. of water (204 oz. minus the amounts of water pre-mixed with the bonding agent, the carboxylated ether concrete additive, and the shrinkage retarder), and dye were combined with 50 lbs. of cement and 50 lbs. of silica. The pre-mixture of bonding agent was then added to the cement/silica mixture. The pre-mixture of carboxylated ether concrete additive was then added to the cement/silica mixture. The pre-mixture of shrinkage retarder was then added to the cement/silica mixture. The cementitious composition was mixed by static mixing. After mixing the cementitious composition, the cementitious composition was poured into a mold to form a tile.

Example 7

Cylinders and beams were prepared according to the method of the invention. More particularly, the cylinders and beams were made of the following composition:

Per 100 lb. mix:
  50 lbs. Portland #1 cement
  50 lbs. very fine glass silica
  1 lb. chopped fiberglass E ½-inch long
  6 oz. 2-inch long synthetic structural fiber
  6 oz. microfilament fiber
  Total liquids in the composition, including chemical additives and water, equaled 2 gallons made up of:
  1 gallon accelerator
  6 oz. bonding agent
  7 oz. shrinking agent
  16 oz. superplasticizer
  Balance of the 2 gallons was water The cylinders were tested for compressive strength and the beams were tested for flexural strength in accordance with ASTM C39 and C78, respectively. The averages of the results are shown in Table 1 below.

TABLE 1

Strength of Cementitious Compositions

| Duration | Compressive Strength of Cylinder (PSI) | Flexural Strength of Beam (PSI) |
|---|---|---|
| 7 Days | 8615 | 150 |
| 28 Days | 9270 | 1380 |

While in the foregoing specification this invention has been described in relation to certain preferred embodiments thereof, and many details have been set forth for purpose of illustration, it will become apparent to those skilled in the art that the invention is susceptible to additional embodiments and that certain of the details described herein can be varied considerably without departing from the basic principles of the invention. Therefore, to particularly point out and distinctly claim the subject matter regarded as the invention, the following claims conclude the specification.

What is claimed is:

1. A cementitious composition, comprising:
   a quantity of cement;
   a quantity of silica;
   a plurality of fibers;
   a quantity of water
   between 3 ounces and 10 ounces superplasticizer per 100 pounds of the cement and the silica; and
   between 3 ounces and 1 quart bonding agent per 100 pounds of the cement and the silica.

2. The cementitious composition of claim 1, comprising the cement and the silica into a ratio of 1:1.

3. The cementitious composition of claim 1, comprising up to about 2 gallons of the water per 100 pounds of the cement and the silica.

4. The cementitious composition of claim 1, wherein the plurality of fibers comprises at least one type of fiber selected from a group consisting of chopped fiberglass E, structural fiberglass, microfiber polypropylene, microfiber polypropylene/polyethylene, and polypropylene microfilaments.

5. The cementitious composition of claim 1, wherein the plurality of fibers comprises up to about 2 pounds of chopped ½-inch fiberglass per 100 pounds of the cement and the silica and up to about 4 ounces of 2-inch structural fiberglass per 100 pounds of the cement and the silica.

6. The cementitious composition of claim 1, wherein the plurality of fibers comprises up to about 16 ounces of chopped ½-inch fiberglass per 100 pounds of the cement and the silica, up to about 4 ounces of 2-inch structural fiberglass per 100 pounds of the cement and the silica, and up to 4 ounces of synthetic microfibers per 100 pounds of the cement and the silica.

7. The cementitious composition of claim 1, further comprising a foam core encapsulated within the composition.

8. The cementitious composition of claim 1, further comprising between 0.5 quart and 3 quarts set accelerator per 100 pounds of the cement and the silica.

9. The cementitious composition of claim 1, further comprising between 1.5 ounces and 0.5 quart shrinkage retarder per 100 pounds of the cement and the silica.

10. The cementitious composition of claim 1, further comprising at least one additive selected from a group consisting of a set accelerator, an air entraining agent, a finishing enhancer, a water reducer, fumed microsilica, metakaolin, and a shrinkage reducer.

11. The cementitious composition of claim 1, further comprising a dye.

12. A sheet of material, having a thickness of between 0.25 and 0.5 inch, comprising the cementitious composition of claim 1.

13. A cementitious composition, comprising:
   a quantity of cement;
   a quantity of silica;
   a plurality of fibers;
   a quantity of water,
   between 3 ounces and 1 quart bonding agent per 100 pounds of the cement and the silica;
   between 3 ounces and 2 quarts carboxylated polyether concrete additive per 100 pounds of the cement and the silica; and
   between 3 ounces and 1 quart shrinkage retarder per 100 pounds of the cement and the silica.

14. The cementitious composition of claim 13, comprising the cement and the silica in a ratio of 1:1.

15. The cementitious composition of claim 13, comprising up to 2 gallons of the water per 100 pounds of the cement and the silica.

16. The cementitious composition of claim 13, wherein the plurality of fibers comprises at least one type of fiber selected from a group consisting of chopped fiberglass E, structural fiberglass, microfiber polypropylene, microfiber polypropylene/polyethylene, and polypropylene microfilaments.

17. The cementitious composition of claim 13, wherein the plurality of fibers comprises up to about 16 ounces of chopped ½-inch fiberglass per 100 pounds of the cement and the silica, up to about 4 ounces of 2-inch structural fiberglass per 100 pounds of the cement and the silica, and up to about 4 ounces of synthetic microfibers.

18. The cementitious composition of claim 13, further comprising between 0.5 quart and 3 quarts set accelerator per 100 pounds of the cement and the silica.

19. The cementitious composition of claim 13, further comprising between 6 ounces and 32 ounces superplasticizer per 100 pounds of the cement and the silica.

20. The cementitious composition of claim 13, further comprising at least one additive selected from a group consisting of a set accelerator, an air entraining agent, a finishing enhancer, a water reducer, a fumed microsilica, metakaolin, and a shrinkage reducer.

21. The cementitious composition of claim 13, further comprising a dye.

22. A sheet of material, having a thickness of between 0.25 and 0.5 inch, comprising the cementitious composition of claim 13.

* * * * *